Feb. 22, 1949. A. LYSHOLM 2,462,652
ROTARY CONVERTER-COUPLING HYDRAULIC
POWER TRANSMISSION
Filed Aug. 25, 1943 2 Sheets-Sheet 2
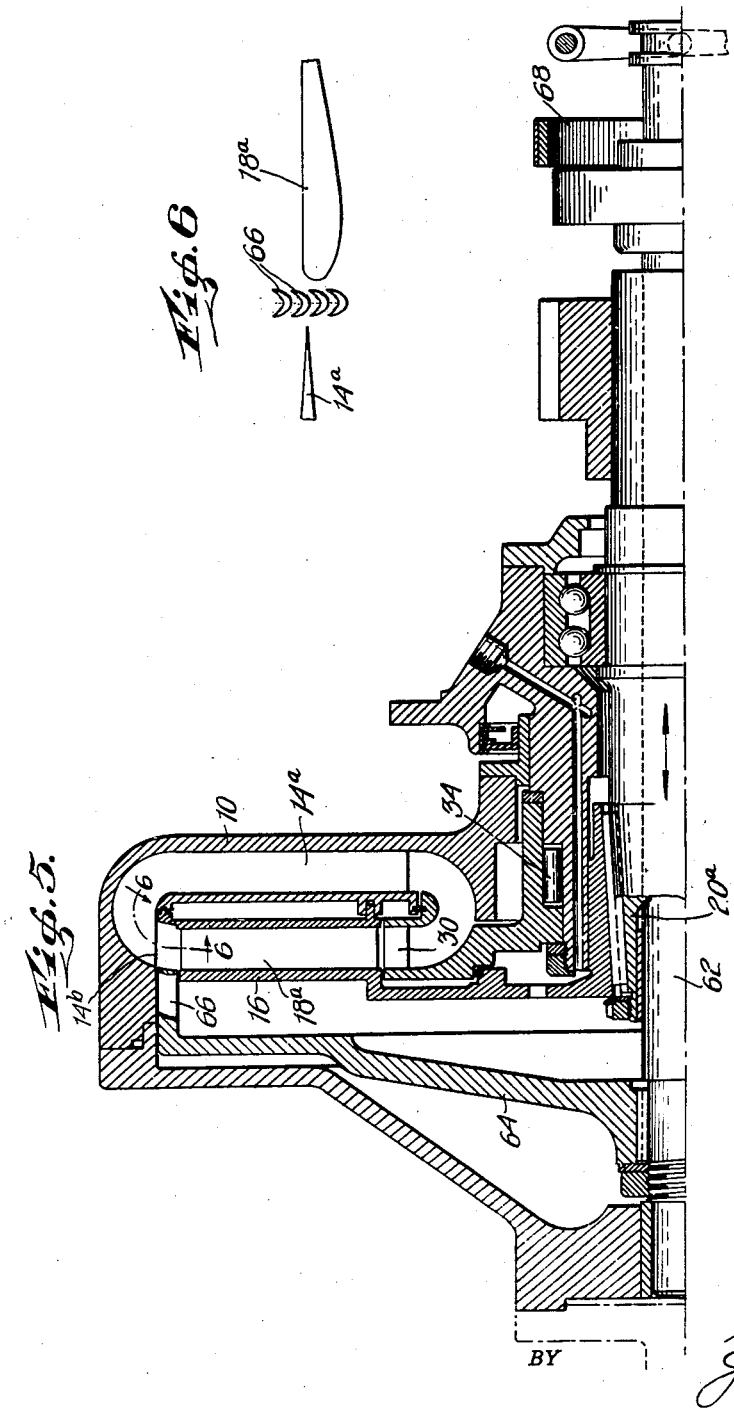

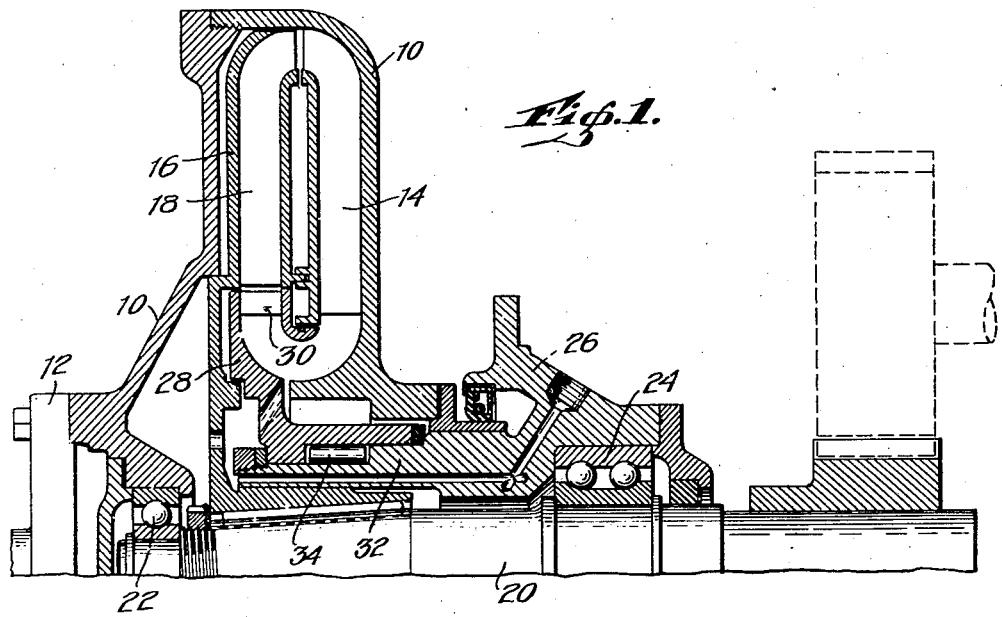
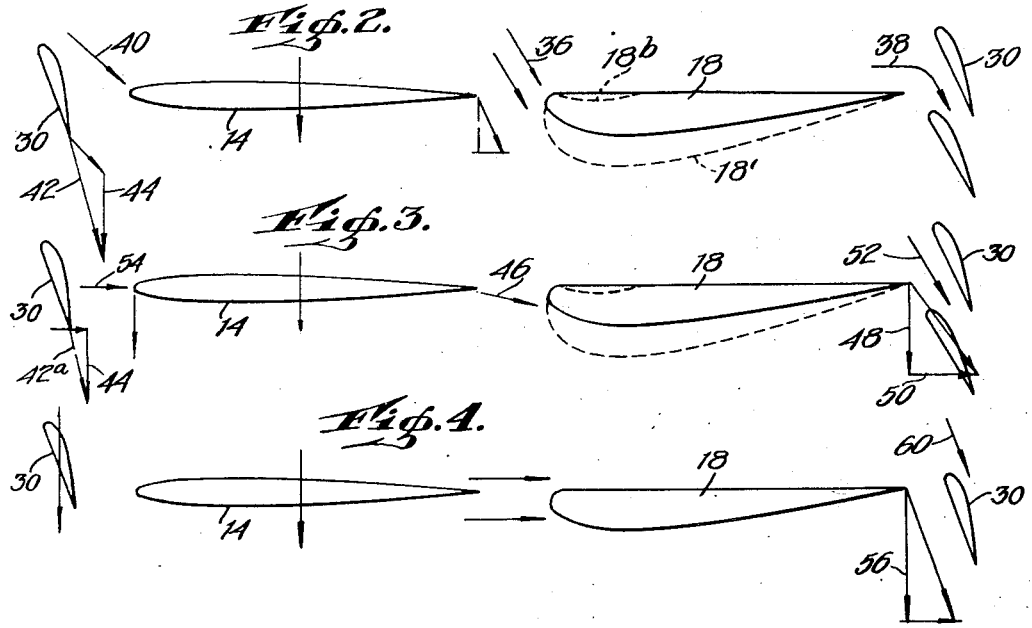

Patented Feb. 22, 1949

2,462,652

UNITED STATES PATENT OFFICE 2,462,652

ROTARY CONVERTER-COUPLING HYDRAULIC POWER TRANSMISSION

Alf Lysholm, Stockholm, Sweden, assignor, by mesne assignments, to Jarvis C. Marble, New York, N. Y., Leslie M. Merrill, Westfield, N. J., and Percy H. Batten, Racine, Wis., as trustees Application August 25, 1943, Serial No. 500,008

6 Claims. (Cl. 60—54)

The present invention relates to hydraulic power transmissions of the closed circuit type and has for its general object the provision of an improved device of the character under consideration which is capable of and inherently and automatically operates under different conditions of relative speed between driving and driven members either as a coupling or as a torque multiplying converter, without sacrificing the desirable efficiency characteristics of either a coupling or a converter.

It has long been recognized that for driving a variable speed load, such as a vehicle, an hydraulic transmission which would function as a torque multiplying converter in the low speed range of operation and as a coupling, with minimum slip and without torque multiplication, in the high speed range, would be most desirable. However, the inherent characteristics of the two devices are in many ways mutually repugnant insofar as the character of blading required is concerned if satisfactory efficiency and operating characteristics for each kind of device are to be obtained and many different expedients have been proposed to overcome the difficulty of providing a satisfactory overall drive, such as providing a transmission embodying a coupling and a converter to be alternatively filled and drained under different conditions of drive or by providing a mechanical direct drive to be used in lieu of a coupling in alternation with a converter. Attempts have also previously been made to combine, in a single circuit, blading which will satisfactorily give both converter and coupling operation. The latter attempts have not, however, given satisfactory results, largely, I believe, because they have been based primarily on the theory of modifying blading designs and arrangements which are essentially suited for converter operation to a form which will give satisfactory coupling performance without materially sacrificing converter performance.

For converters as employed in practice up to the present time the peak efficiency obtainable is around 85% and the relative speed at which the peak efficiency is reached, while subject to a certain amount of variation by changes in design, is ordinarily reached when the driven or secondary speed is within the range of from 40% to 60% of the driving or primary speed. If the usual converter is designed to place the peak efficiency outside of this range, other characteristics necesssary for a satisfactory variable speed transmission must be sacrificed to an extent making such a course undesirable.

With a peak efficiency of the order of that noted above and with the peak located within the speed range noted, satisfactory operating characteristics for a combined converter coupling are not attainable. Among the primary reasons for this is the fact that the efficiency of a coupling falls off in direct proportion with increase in the slip between the primary and secondary members. Consequently, the transition from converter to coupling operation must take place in a satisfactory transmission at a high percentage of relative speed between driving and driven members, or in other words, at a relatively low value of slip.

As previously noted, peak efficiency with the usual converter construction occurs at comparatively low relative speed or high slip and consequently, when the conventional converter design, or variation thereof, is attempted to be combined with a construction adapted to operate in the top speed range as a coupling, there is a range of relative speed or slip between that at which peak converter efficiency is secured and that at which low slip and high efficiency operation as a coupling is attained, in which the efficiency is too low to be satisfactory.

Also, since the input torque characteristic of a converter is relatively constant, and that of a coupling rises sharply with increase in slip, it is impractical to combine blading in a single hydraulic circuit providing the usual converter characteristics in one speed range and the usual coupling characteristics in another speed range. This may readily be illustrated by a simple example. If it is assumed that a coupling is designed to transmit 100 foot pounds of torque at a normal minimum slip of 5%, then the torque required to maintain full primary or engine speed at 30% slip will be of the order of four hundred foot pounds. At minimum slip, the coupling should be able to transmit the full power of the engine; consequently the proper engine for this coupling should develop 100 foot pounds of torque at normal full speed. With such an engine, even though the value of the torque rises somewhat with decrease in speed, as in the case of an internal combustion engine, the increase in the torque load imposed on the engine by the coupling as the slip increases, slows the engine down. In the example assumed, the engine will be slowed down at 30% slip to approximately one-half normal full speed. Since with a normal converter the peak efficiency usually occurs at considerably higher slip than 30% and thereafter falls off as the slip decreases, 30% slip is a fair value of minimum slip practically usable in converter drive, since any lesser slip in converter drive will ordinarily be accompanied by an unacceptably low efficiency. Consequently if the changeover point is designed for 30% slip because of limitations of converter efficiency, the torque input characteristics of the converter at 30% slip must match the coupling input characteristic at 30% slip, which in the example is so high that engine speed is reduced to one-half normal speed. Since the input torque characteristic of the converter is relatively constant, this would mean that the engine could operate at only about half speed throughout the slip range of the converter, which is obviously inadmissible. If, on the other hand, an engine were provided with sufficient torque to operate the device at full primary speed as a coupling with 30% slip, the engine would have to be progressively and materially throttled as the slip in coupling operation decreases from 30% toward the normal minimum slip. Otherwise, due to the inherent torque input characteristics of the coupling, the engine would run away as the slip decreased. This also is inadmissible, since it would not permit full power of the engine to be developed and transmitted in the slip range of coupling operation.

In accordance with the present invention I propose to overcome the operating deficiencies of the forms of combined converter coupling devices heretofore proposed, by the provision of a novel form and arrangement of blading in a hydraulic circuit which will give materially different concerter characteristics from those usually provided by a converter and which will enable converter operation to be employed up to such a low value of slip and with a degree of efficiency at the low slip that changeover to coupling operation can be practicably effected at a point in the operating range which will enable the power of the engine to be satisfactorily made use of in the coupling range which lies above the changeover point.

To this end a three element circuit is employed; that is, a circuit in which only one stage each of pump blades, turbine blades and guide blades are employed and in which the pump and turbine blades are both straight or nearly straight and arranged radially or nearly so, with the guide blades arranged to provide always a vortex at the pump entrance having a peripheral component of flow of relatively high value. Further, with this general arrangement of blading, the profiling of all of the different blades and the relation of the different sets of blades to each other are coordinated in novel manner to produce the desired results by influencing the flow characteristics of the circulated fluid in a manner hereinafter to be more fully pointed out in detail.

In order that the more detailed nature of the invention, and the advantages to be derived from its use, may best be understood, reference may be had to the following portion of this specification and to the accompanying drawings, in which suitable apparatus for carrying the invention into effect is described and illustrated by way of example but without limitation.

In the drawings:

Fig. 1 is a more or less diagrammatic longitudinal half section showing a transmission embodying the invention;

Fig. 2 is a developed view of the blading in the hydraulic circuit showing flow conditions at stall of the driven member;

Fig. 3 is a view similar to Fig. 2 showing flow conditions under another operating condition of the driven member;

Fig. 4 is a view similar to Fig. 2 showing flow conditions under still another operating condition of the driven member;

Fig. 5 is a view similar to Fig. 1 showing another form of the transmission embodying the invention; and Fig. 6 is a fragmentary developed section on line 6—6 showing part of the blading of the circuit shown in Fig. 5.

Referring now more particularly to Fig. 1 of the drawings, the transmission comprises a rotatably mounted casing 10 fixed to the driving or primary shaft 12 and carrying the pump blades 14. The driven or secondary member is provided by the turbine wheel 16 carrying turbine blades 18 and fixed to the driven shaft 20, the latter being mounted by bearing 22 carried by the casing 10 and bearing 24 carried by a stationary housing part 26.

The reaction member is provided by the wheel 28 carrying guide blades 30 and mounted to rotate on a forwardly extending sleeve portion 32 of the stationary housing 26. Wheel 28 is permitted to turn only in the same direction as the pump wheel, being fixed against counter-rotation by the freewheel clutch 34.

One aspect of the general arrangement above described is highly important to the present invention. If the very high peak efficiency in converter operation which is required for the purposes of this invention is to be obtained, it is necessary to employ a rotating casing which carries either the pump or the turbine blades, a casing carrying the pump blades being shown in the present example. For maximum efficiency it is evident that all losses must be minimized and for the purposes of the present invention it is most important that losses be kept to the minimum in the low slip range of converter operation. With a rotary casing the rotation loss in the low slip range is kept at a minimum since with such an arrangement the relative rotation between the casing and the contained wheel (whether it is the pump wheel or the turbine wheel is immaterial), which is productive of rotation losses, becomes progressively less as the slip decreases. Thus rotation losses with a rotating casing, detract least from efficiency of operation in the range where high efficiency is desired. Also, with a rotating casing, the leakage losses, which detract from efficiency, are minimized, since with such a construction the space between the casing wall and the contained blade is defined on both sides by rotating walls, which through friction cause the fluid in such space to rotate and create a hydraulic head due to centrifugal force, which head tends to counterbalance the pressure head in the hydraulic circuit tending to produce leakage.

In order to achieve the characteristics of operation constituting the objective of the invention, the arrangement and profiling of the blading is most important, and while as hereinafter more fully explained, certain variations are permissible in order to modify operating characteristics to best meet the requirements of specific installations, blading having characteristics of the example shown in Fig. 1 and related figures is required if optimum results are to be obtained.

As shown by Fig. 2, the pump blading differs from the usual converter pump blading in that it is arranged radially or substantially radially.

Also, the profile of the blades 14 differs materially from the usual in that it is much thicker through the entrance part of the section than a conventional pump blade, resembling very closely a typical airfoil section. In the example illustrated, the thickness ratio of the profile, that is, the ratio of the maximum thickness to the chord of the blade, is about 8%. For meeting specific conditions this ratio is subject to alteration but is preferably in the range of from 6% to 12%. The point of maximum thickness of the profile should, moreover, come at a position not more than a third of the length of the chord back of the entrance edge of the blade and preferably is nearer, in the range of from 20% to 25% of the length of the chord behind the entrance edge.

The turbine blading, as shown by Fig. 3, is arranged substantially radially and also has an airfoil type profile characterized by a substantially flat or only slightly concave forward or front blade face. The thickness of the turbine blade section, as determined by the contour or profile of the rear face of the blade, will be determined by the performance factor of the device which is critical for a given installation. If high efficiency at low slip in converter operation is desired, a blade profile such as that shown in full lines is advantageously employed. Preferably, however, the maximum thickness of the blade should not be less than about 10% of the chord of the blade section. Maximum efficiency is gained with such a blade form at the expense of the amount of stall torque obtainable, and where high stall torque is more important than maximum obtainable top efficiency. a thicker profile of the nature indicated at 18' is advantageously employed, the profile shown indicating about the maximum permissible blade thickness, which should ordinarily not exceed about 25% of the chord of the blade section. When a very thick blade section is employed it may also be advantageous to give the blade a slightly greater degree of concavity or camber at the inlet portion of its forward face, as indicated at 18b.

The reaction or guide blades 30 are also of generally airfoil section and are located to provide a relatively small outlet angle, which ordinarily will not exceed 20° and which may in some cases be as small as 10°.

Blades 30 are of relatively thin section and, as will be observed from Fig. 2, the front face of the blade is relatively flat, the greater curvature being on the reverse or rear face.

By reference to Figs. 2 to 4, the flow characteristics under different operating conditions may best be appreciated. Considering first the condition at stall, as shown in Fig. 2, with the pump operating the relative inlet angle of the liquid flowing to the stalled turbine blades 18 will be as indicated by the arrows 36, and from inspection of this figure it will be evident that if the best stalling torque characteristic is desired, the thickest section blade will be used, in order to secure the most advantageous inlet flow conditions to the turbine blading.

With the turbine blading stalled, the flow to the reaction blading will be substantially radial, as indicated by arrow 38, and the liquid will be sharply deflected and accelerated in this blading to produce a discharge flow having a high circumferential velocity component as compared with the radial component. It will be noted, however, that this deflection, owing to the profiling of the reaction blades employed, may be effected without creating undue turbulence and consequent loss. It is further to be noted that the relatively smooth flow and deflection obtainable minimizes resistance to flow under stall conditions which is desirable since a high rate of circulation of the working liquid, that is, the quantity of liquid circulated per unit time between the driving and driven members of the device, is desirable in order to secure the maximum ratio of torque multiplication.

Since the reaction blades are stationary, the relative inlet angle of flow to the pump blades at stall will be as indicated by arrow 40, this direction of relative flow being produced by the relatively high velocity of discharge from the reaction blades, designated by the vector 42, and the peripheral velocity of the pump, indicated by vector 44.

As the speed of the turbine blading increases from stall, the rate of circulation decreases, and at the changeover point from converter to coupling operation, which may be assumed to be when the turbine speed is between 85% and 90% of the pump speed, the flow diagram is as shown in Fig. 3. Under this condition, since the turbine speed is nearly that of the pump speed, and since the outlet from the pump blades is substantially radial, the relative inlet angle of flow to the turbine blades is close to radial as indicated by arrow 46. Due to the relatively high peripheral velocity of the turbine blading indicated by vector 48 and the lower rate of circulation, indicated by vector 50, the relative inlet angle of the flow to the reaction blades is as indicated by arrow 52, which it will be noted results in substantially undeflected flow through the reaction member with consequently negligible torque imposed thereon. Also, because of the decreased rate of circulation at high turbine speed, the velocity triangle representative of the fluid flow from the reaction blades will be much blunter than at stall, the vector 42a being only about or even less than half of the length of vector 42 of Fig. 2. With constant primary or pump speed, this will result in substantially radial relative inlet flow to the pump blades, as indicated by arrow 54. By inspection of Fig. 3 it is thus evident that at the changeover point, the flow is essentially the same as would obtain in a two element coupling operating at low slip, with substantially radial relative inlet flow to both pump and turbine blades, and with the nature of the flow not materially interfered with by the reaction blading.

If after reaching the changeover point, at which time the reaction blades cease to have any material torque absorbing function, the nature of the load on the turbine member is such that it can further increase its speed, the value of the peripheral vector increases from that shown at 48 in Fig. 3 to a value such as for example as shown at 56 in Fig. 4. The increase in turbine speed is accompanied by a further slowing down of the circulation rate and these two factors together operate to cause the relative angle of inlet flow to the reaction blading to become more acute as indicated by arrow 60. If the reaction blade member is fixed, this will cause the fluid to impinge on the rear faces of the reaction blades, causing some loss and further causing a departure from true coupling operation because of the imposition of a torque on a third element in the circuit. In some instances where the changeover is at a value of slip not far removed from the minimum slip obtainable with coupling operation under normal full load, the slight change in angle which may occur at speeds above the changeover point may be disregarded and the reaction member be made a fixed member. In other cases, where there may be a material range of turbine speed between that at the changeover point and that corresponding to minimum obtainable slip in coupling operation, the reaction member is advantageously freewheeled so as to be able to "float" at a speed such that by having some peripheral velocity, the angle of discharge from the turbine blades produces a relative inlet angle to these reaction blades the same as at the changeover point.

As hereinbefore noted, the problem of providing for satisfactory coupling and converter operation from a single circuit is approached in accordance with the principles of the present invention primarily from the standpoint of modifying coupling structure to secure satisfactory converter operation without destroying the effectiveness of the device as a coupling, and to this end the discharge edges of the pump blades and the inlet edges of the turbine blades are preferably located in relatively close proximity in the radially outermost part of the circuit where the direction of flow is substantially axial. This is not ordinarily the most desirable converter, but I have found that for overall performance the placing of these edges in this position has far less detrimental effect on converter operations than has for example a substantial gap between pump outlet edges and turbine inlet edges on coupling operation.

From the foregoing it will be seen that, contrary to what might be expected, a device of the kind under consideraion, even though operating throughout the major portion of its speed range as a converter, must more closely approach coupling design than converter design if the desired results are to be achieved.

For some kinds of applications, as for example automotive vehicle drives, it may be desirable to provide for a hydraulically actuated reverse and in Figs. 5 and 6 such an arrangement embodying the invention is illustrated. In this form the casing 10 carries pump blades 14a while the turbine wheel 16 carries turbine blades 18a. The driven member to which the turbine wheel is attached is in this instance a sleeve 20a, within which is mounted an axially shiftable central shaft member 62 carrying a reversing wheel 64 having a row of reversing blades 66 axially shiftable into and out of the circuit. Any suitable control may be provided for shifting the shaft 62 and it will be obvious that when shifted to the position in which blades 66 are in the circuit the shift must be held against rotation. While it is readily possible to provide splines or other means permitting axial shift of the shaft while holding it against rotation, it is highly desirable to provide releasable holding means which will enable the shaft and the reversing blades to rotate freely or "float" when the reversing blades are withdrawn from the circuit. Otherwise substantial losses will result when in forward operation, due to the pressure on the stationary wheel 64 and blades 66 between the rotating turbine wheel and the rotating casing. Some loss will be incurred due to this factor when in reverse, but, for the kind of installation intended, operation in reverse usually is required for only a small fraction of the total time of operation and at relatively low maximum speed, so that the lower efficiency in reverse is not important compared with the advantage of being able to dispense with a separate reverse gear. In the example shown, a band brake 68 has been indicated for selectively holding the shaft 62 when it is in reversing position.

The reaction blading 30 is as previously described being held by the freewheel clutch 34. The turbine blades 18a are shorter, in order to accommodate the reversing blades 66 and the pump blades are advantageously carried around to provide outlet edges 14b so that when blades 66 are withdrawn from the circuit there is a minimum gap between pump outlet and turbine outlet.

Obviously many variations in the specific design and arrangement of parts may be made without departing from the principles of the invention, the scope of which is to be understood as embracing all forms of apparatus falling within the scope of the appended claims.

What is claimed:

1. A hydraulic transmission of the closed circuit type comprising a driving member carrying a ring of substantially radially disposed pump blades, a driven member carrying a ring of substantially radially disposed turbine blades to which the pump blades directly discharge fluid in normal forward operation of the device and a reaction member carrying a ring of guide blades to which said turbine blades directly discharge fluid, said guide blades having an acute outlet angle and having profiles including relatively thick and bluntly rounded inlet portions shaped to provide channels for smooth flow in the inlet portions of the channels of liquid delivered thereto within a range of inlet angles varying from substantially radial when the turbine blades are at stall to an angle substantially the same as said outlet angle when the speed of the turbine blades approaches that of the pump blades, and said profiles further providing therebetween relatively straight channels for substantially undeflected flow of the liquid through the reaction member under the latter conditions of operation.

2. A device as set forth in claim 1, in which the turbine blades have profiles providing thick and bluntly rounded inlet portions and trailing faces substantially less curved than the leading faces.

3. A device as set forth in claim 1, in which the turbine blades have profiles providing thick and bluntly rounded inlet portions and substantially straight trailing faces.

4. A device as set forth in claim 1, in which said guide blades have faces on the normally impinged sides of the blades having substantially less curvature than the opposite sides.

5. A hydraulic transmission of the closed circuit type comprising a driving member carrying a ring of substantially radially disposed pump blades, a driven member carrying a ring of substantially radially disposed turbine blades to which the pump blades directly discharge liquid in normal forward operation of the device and a reaction member carrying a ring of guide blades to which said turbine blades directly discharge liquid, said guide blades having an acute outlet angle within the range of between approximately 10° and approximately 20° and having profiles including relatively thick and bluntly rounded inlet portions shaped to provide channels for smooth flow in the inlet portions of the channels of liquid delivered thereto within a range of inlet angles varying from substantially radial when the turbine blades are at stall to an angle substantially the same as said outlet angle when the speed of the turbine blades approaches that of the pump blades, and said profiles further providing therebetween relatively straight channels for substantially undeflected flow of the liquid through the reaction member under the latter conditions of operation.

6. A hydraulic transmission of the closed circuit type comprising a driving member carrying a ring of substantially radially disposed pump blades, said blades having profiles of airfoil type dimensioned so that in the region of between one-fifth and one-third of the distance along the chord of the profile back of the inlet edge the transverse thickness of the profile is within the range of approximately six percent to twelve percent of the chord, a driven member carrying a ring of substantially radially disposed turbine blades to which the pump blades directly discharge liquid in normal forward operation of the device, said turbine blading being relatively thick and bluntly rounded and having profiles providing a substantially straight trailing face and a convex leading face having substantial curvature over the inlet region of the profile, and a reaction member carrying a ring of guide blades to which said turbine blades directly discharge liquid, said guide blades having an acute outlet angle and having profiles including relatively thick and bluntly rounded inlet portions shaped to provide channels for smooth flow in the inlet portions of the channels of liquid delivered thereto within a range of inlet angles varying from substantially radial when the turbine blades are at stall to an angle substantially the same as said outlet angle when the speed of the turbine blades approaches that of the pump blades and said profiles further providing therebetween relatively straight channels for substantially undeflected flow of the liquid through the reaction member under the latter conditions of operation.

ALF LYSHOLM.

REFERENCES CITED

The following references are of record in the file of this patent:

UNITED STATES PATENTS

| Number | Name | Date |
| --- | --- | --- |
| 1,298,990 | Mason | Apr. 1, 1919 |
| 2,122,353 | Salerni | June 28, 1938 |
| 2,212,901 | Schneider | Aug. 27, 1940 |
| 2,216,411 | Heppner | Oct. 1, 1940 |
| 2,255,430 | Lysholm | Sept. 9, 1941 |
| 2,306,758 | Schneider et al. | Dec. 29, 1942 |
| 2,381,682 | Mayner | Aug. 7, 1945 |

FOREIGN PATENTS

| Number | Country | Date |
| --- | --- | --- |
| 425,538 | Great Britain | 1935 |
| 442,363 | Great Britain | 1936 |
| 507,076 | Great Britain | 1937 |